US011961725B2

(12) United States Patent
Kodama et al.

(10) Patent No.: US 11,961,725 B2
(45) Date of Patent: Apr. 16, 2024

(54) PHOTOTUBE

(71) Applicant: HAMAMATSU PHOTONICS K.K., Hamamatsu (JP)

(72) Inventors: Tsuyoshi Kodama, Hamamatsu (JP); Masaki Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/026,364

(22) PCT Filed: Sep. 3, 2021

(86) PCT No.: PCT/JP2021/032495
§ 371 (c)(1),
(2) Date: Mar. 15, 2023

(87) PCT Pub. No.: WO2022/074981
PCT Pub. Date: Apr. 14, 2022

(65) Prior Publication Data
US 2023/0369035 A1 Nov. 16, 2023

(30) Foreign Application Priority Data
Oct. 6, 2020 (JP) ................................ 2020-169149

(51) Int. Cl.
*H01J 40/06* (2006.01)
*H01J 40/10* (2006.01)
*H01J 40/16* (2006.01)

(52) U.S. Cl.
CPC .............. *H01J 40/06* (2013.01); *H01J 40/10* (2013.01); *H01J 40/16* (2013.01)

(58) Field of Classification Search
CPC ............ H01J 40/06; H01J 40/10; H01J 40/16
See application file for complete search history.

(56) References Cited

U.S. PATENT DOCUMENTS 4,060,747 A * 11/1977 Faulkner ................ H01J 19/38 313/536
11,118,969 B2 9/2021 Fukasawa et al.
(Continued)

FOREIGN PATENT DOCUMENTS

JP S51-017456 U 2/1976
JP H8-222178 A 8/1996
(Continued)

OTHER PUBLICATIONS

International Preliminary Report on Patentability dated Apr. 20, 2023 for PCT/JP2021/032495.

*Primary Examiner* — Evan P Dzierzynski
*Assistant Examiner* — Nathaniel J Lee
(74) *Attorney, Agent, or Firm* — Faegre Drinker Biddle Reath LLP

(57) ABSTRACT

A photoelectric tube includes a housing including a light transmitting portion, an electron emitting portion including a photoelectric surface disposed inside the housing, an electron capturing portion disposed between the light transmitting portion and the photoelectric surface inside the housing, and a conductive layer disposed on a light transmitting portion side of at least a part of the electron capturing portion to face the photoelectric surface inside the housing and configured to allow light to pass therethrough.

11 Claims, 9 Drawing Sheets

(56) References Cited

U.S. PATENT DOCUMENTS

| | | | |
|---|---|---|---|
| 2004/0232403 | A1 | 11/2004 | Sillmon et al. |
| 2010/0102720 | A1 | 4/2010 | Egawa et al. |

FOREIGN PATENT DOCUMENTS

| | | | | |
|---|---|---|---|---|
| JP | H10-275587 | A | | 10/1998 |
| JP | 2000-149767 | A | | 5/2000 |
| JP | 2000-149858 | A | | 5/2000 |
| JP | 2000149858 | A | * | 5/2000 |
| JP | 3854723 | B2 | | 12/2006 |
| JP | 2018-097925 | A | | 6/2018 |
| JP | 2019-067494 | A | | 4/2019 |
| JP | 2019-067495 | A | | 4/2019 |

* cited by examiner

PHOTOTUBE

TECHNICAL FIELD

The present disclosure relates to a photoelectric tube.

BACKGROUND ART

There has been a known photoelectric tube including a housing having a light transmitting portion, an electron emitting portion (photocathode) having a photoelectric surface disposed inside the housing, and a mesh-shaped or dot-shaped electron capturing portion (anode) formed on a surface of the light transmitting portion on an electron emitting portion side (for example, see Patent Literatures 1 and 2).

CITATION LIST

Patent Literature

Patent Literature 1: Japanese Unexamined Patent Publication No. 2019-067494

Patent Literature 2: Japanese Unexamined Patent Publication No. 2018-097925

SUMMARY OF INVENTION

Technical Problem

In the photoelectric tube, when the mesh-shaped electron capturing portion is coarsely formed or the dot-shaped electron capturing portion is formed small in order to improve a probability that light incident on the light transmitting portion from the outside reaches the photoelectric surface, there is concern that a probability that photoelectrons emitted from the photoelectric surface are captured by the electron capturing portion may decrease. On the other hand, when the mesh-shaped electron capturing portion is densely formed or the dot-shaped electron capturing portion is formed large in order to improve a probability that photoelectrons emitted from the photoelectric surface are captured by the electron capturing portion, there is concern that a probability that light incident on the light transmitting portion from the outside reaches the photoelectric surface may decrease. Therefore, the above-described configuration of the photoelectric tube cannot be considered as a configuration having high light detection efficiency.

An object of the present disclosure is to provide a photoelectric tube capable of improving light detection efficiency.

Solution to Problem

A photoelectric tube of an aspect of the present disclosure includes a housing including a light transmitting portion, an electron emitting portion including a photoelectric surface disposed inside the housing, an electron capturing portion disposed between the light transmitting portion and the photoelectric surface inside the housing, and a conductive layer disposed on the light transmitting portion side of at least a part of the electron capturing portion to face the photoelectric surface inside the housing and configured to allow light to pass therethrough.

In the photoelectric tube, the electron capturing portion is disposed between the light transmitting portion and the photoelectric surface inside the housing, and the conductive layer is disposed on the light transmitting portion side of at least a part of the electron capturing portion to face the photoelectric surface inside the housing. In this way, since the electron capturing portion is provided separately from the conductive layer (that is, since the conductive layer alone does not need to perform a function of capturing photoelectrons), the conductive layer can be configured to allow sufficient light to pass therethrough. In this way, light incident on the light transmitting portion from the outside easily reaches the photoelectric surface. For this reason, it is possible to improve a probability that light incident on the light transmitting portion from the outside reaches the photoelectric surface. In addition, for example, by applying a negative potential to the electron emitting portion with a potential of the electron capturing portion as a reference, and applying a negative potential (or the same potential as a potential of the electron emitting portion) to the conductive layer with the potential of the electron emitting portion as a reference, even when some of photoelectrons emitted from the photoelectric surface travel toward the light transmitting portion, the some photoelectrons bounce back and easily reach the electron capturing portion due to repulsive force generated between the some photoelectrons and the conductive layer. For this reason, it is possible to improve a probability that the photoelectrons emitted from the photoelectric surface are captured by the electron capturing portion. As described above, according to the photoelectric tube, it is possible to improve light detection efficiency.

In the photoelectric tube of an aspect of the present disclosure, the conductive layer may be disposed along the light transmitting portion to face the photoelectric surface inside the housing. In this way, it is possible to exhibit an effect of the conductive layer along the light transmitting portion.

In the photoelectric tube of an aspect of the present disclosure, the electron capturing portion may be a plate-shaped member, and may be disposed to divide a region inside the housing when viewed from the light transmitting portion side. In this way, even light incident on the light transmitting portion at a large incident angle easily reaches the photoelectric surface by being reflected by each of a pair of main surfaces of the electron capturing portion. For this reason, it is possible to further improve the probability that the light incident on the light transmitting portion from the outside reaches the photoelectric surface. In addition, the photoelectrons emitted from the photoelectric surface easily reach each of the pair of main surfaces of the electron capturing portion. For this reason, it is possible to further improve the probability that the photoelectrons emitted from the photoelectric surface are captured by the electron capturing portion.

In the photoelectric tube of an aspect of the present disclosure, the housing may further include a main body having a recess, the light transmitting portion may be attached to the main body to close an opening of the recess, the electron emitting portion and the electron capturing portion may be supported by the main body, and the conductive layer may be supported by the light transmitting portion. In this way, a configuration in which the photoelectric surface, the electron capturing portion, and the conductive layer are disposed with high accuracy can be easily and reliably realized.

In the photoelectric tube of an aspect of the present disclosure, the electron emitting portion may be disposed on an inner surface of the recess, the electron capturing portion may bridge over an opening edge of the recess, and the conductive layer may be disposed on a surface of the light transmitting portion on an electron emitting portion side. In this way, the configuration in which the photoelectric surface, the electron capturing portion, and the conductive layer are disposed with high accuracy can be realized with an efficient layout.

The photoelectric tube of an aspect of the present disclosure may further include a first conductive portion electrically connected to the electron capturing portion, and a second conductive portion electrically connected to the conductive layer, in which a part of the first conductive portion, a part of the second conductive portion, and a part of the electron emitting portion may be exposed to an outside on a surface of the main body on an opposite side from the light transmitting portion. In this way, on the same surface (the surface of the main body on the opposite side from the light transmitting portion) where incidence of light on the light transmitting portion is not hindered and access of an external wiring is easy, the external wiring can be electrically connected to each of the part of the first conductive portion, the part of the second conductive portion, and the part of the electron emitting portion. In addition, a desired potential can be applied to each of the electron emitting portion, the electron capturing portion, and the conductive layer.

The photoelectric tube of an aspect of the present disclosure may further include a first conductive portion electrically connected to the electron capturing portion, a second conductive portion electrically connected to the conductive layer, and a wiring electrically connecting the electron emitting portion and the conductive layer to each other, in which a part of the first conductive portion and a part of the second conductive portion may be exposed to an outside on a surface of the main body on an opposite side from the light transmitting portion. In this way, on the same surface (the surface of the main body on the opposite side from the light transmitting portion) where incidence of light on the light transmitting portion is not hindered and access of an external wiring is easy, the external wiring can be electrically connected to each of the part of the first conductive portion and the part of the second conductive portion. In addition, it is possible to simplify a structure of a conductive portion for electrically connecting the external wiring.

Advantageous Effects of Invention

According to the present disclosure, it is possible to provide a photoelectric tube capable of improving light detection efficiency.

DESCRIPTION OF EMBODIMENTS

Figure 1:
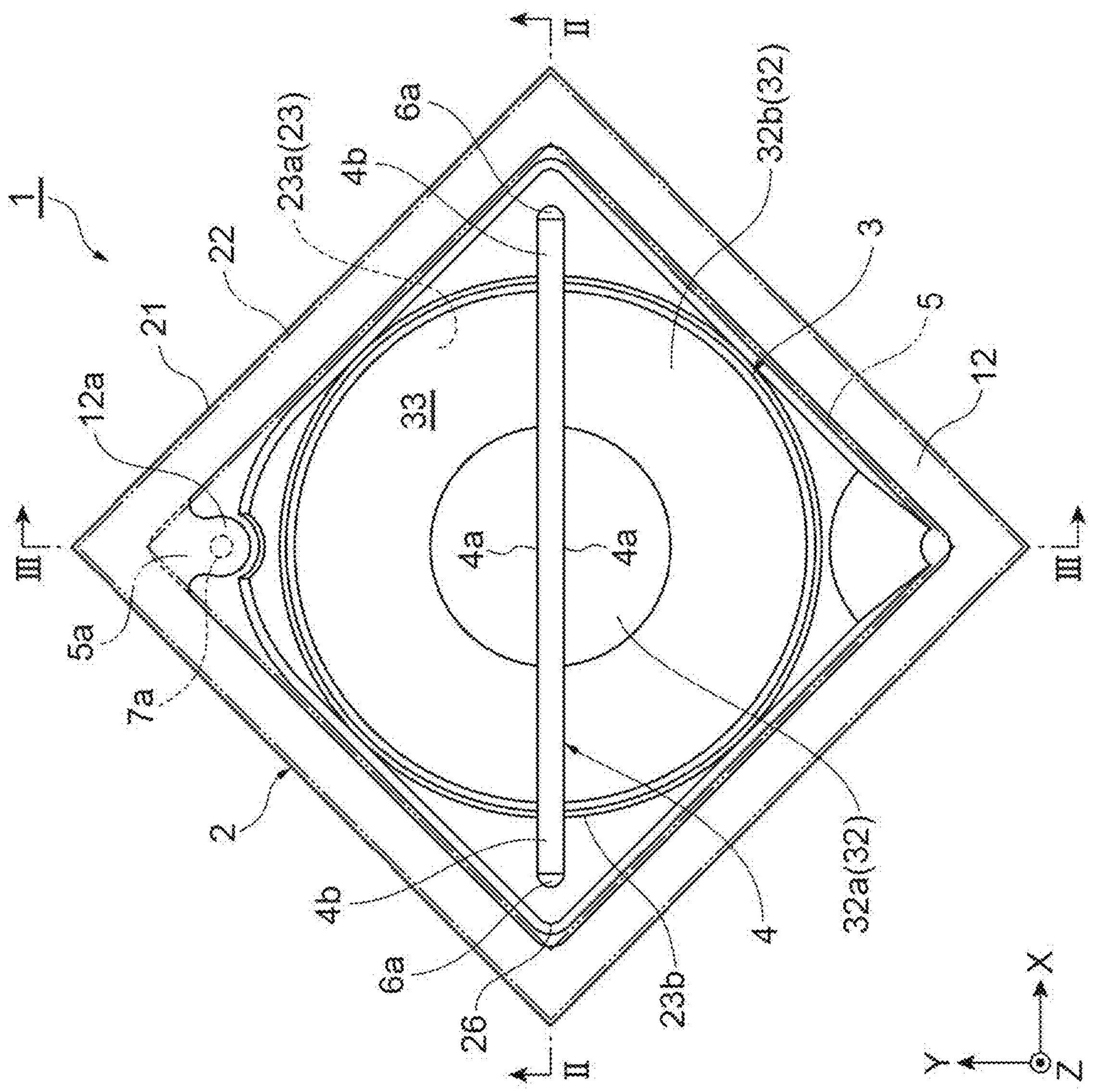
FIG. 1 is a plan view of a photoelectric tube of an embodiment.

Hereinafter, an embodiment of the present disclosure will be described in detail with reference to the drawings. Note that, in each figure, the same or corresponding parts are denoted by the same reference numerals, and redundant descriptions are omitted.

Figure 2:
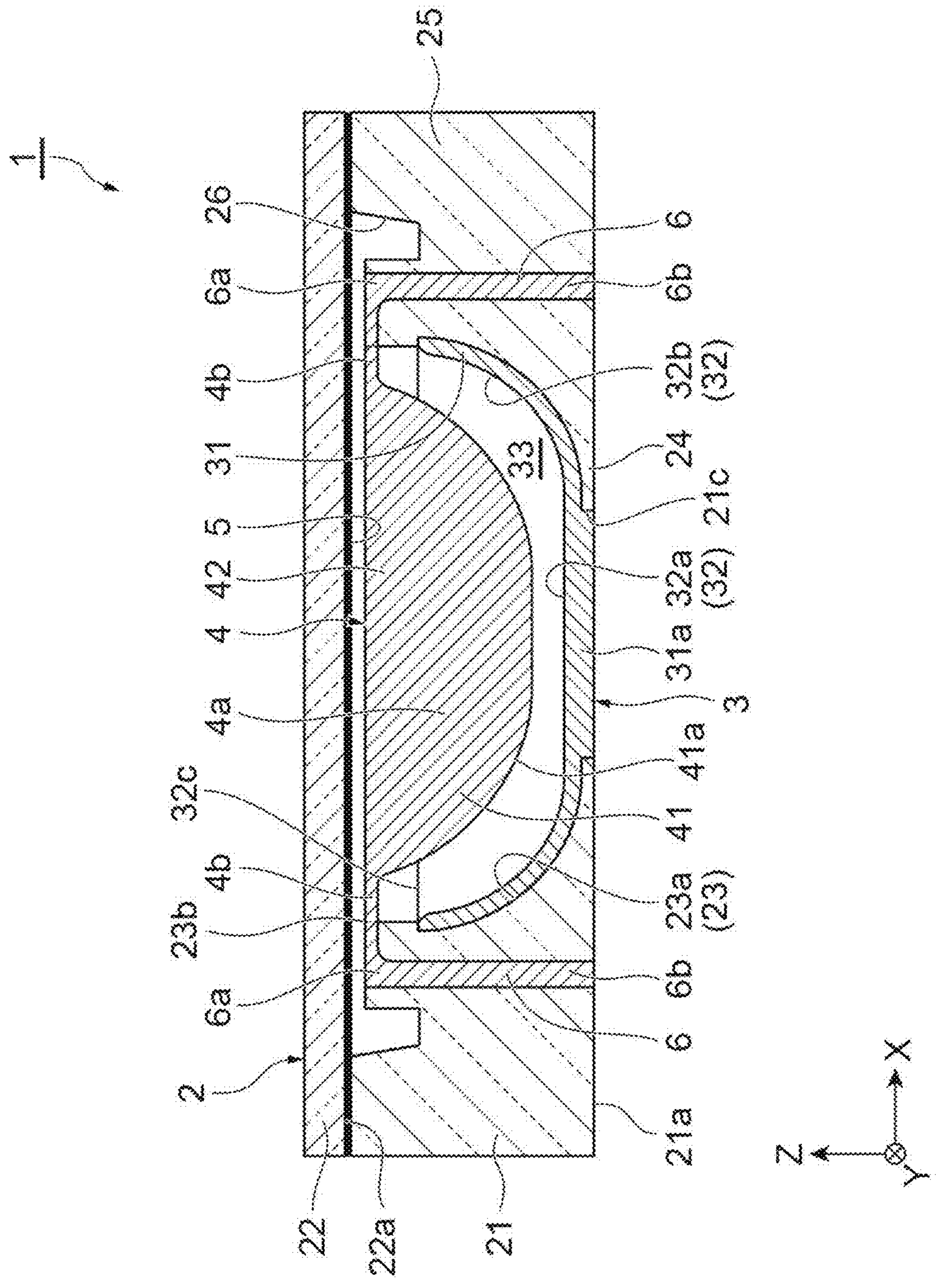
FIG. 2 is a cross-sectional view of the photoelectric tube illustrated in FIG. 1 taken along line II-II.
Figure 3:
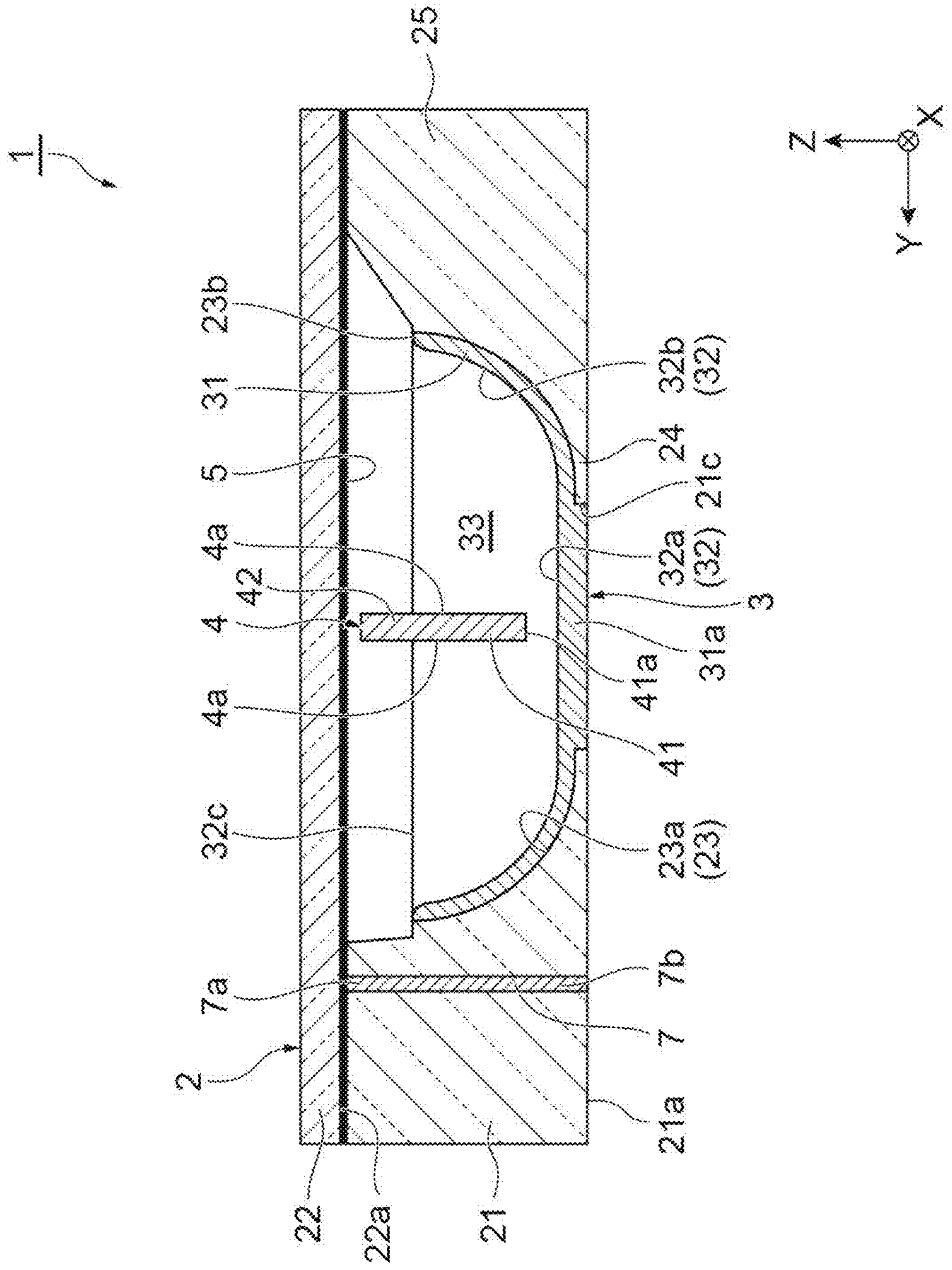
FIG. 3 is a cross-sectional view of the photoelectric tube illustrated in FIG. 1 taken along line III-III.

As illustrated in FIGS. 1, 2 and 3, a photoelectric tube 1 includes a housing 2, an electron emitting portion 3, an electron capturing portion 4, a conductive layer 5, a pair of first conductive portions (conductive portions) 6, and a second conductive portion 7. In the photoelectric tube 1, the electron emitting portion 3 functions as a photocathode, and the electron capturing portion 4 functions as an anode. Light to be detected by the photoelectric tube 1 is, for example, ultraviolet rays.

The housing 2 includes a main body 21 and a light transmitting portion 22. The main body 21 has a recess 23 that opens on one side in a Z-axis direction. In the main body 21, the recess 23 is defined by a bottom wall 24 and a side wall 25. A groove 26 is formed between the recess 23 and the side wall 25 so as to substantially surround the recess 23, and withstand voltage characteristics between members to which different potentials are applied are improved. The main body 21 is, for example, a plate-shaped member (thickness: about several mm) having a square shape (length of one side: about 10 mm) when viewed in the Z-axis direction, and is made of an insulating material (for example, Kovar glass). The light transmitting portion 22 is attached to the main body 21 so as to close an opening of the recess 23. The light transmitting portion 22 transmits light to be detected by the photoelectric tube 1. The light transmitting portion 22 is, for example, a plate-shaped member (thickness: 1 mm or less) having a square shape (length of one side: about 10 mm) when viewed in the Z-axis direction, and is made of an insulating material (for example, quartz glass). In the present embodiment, a region inside the housing 2 is maintained in a high vacuum.

Figure 4:
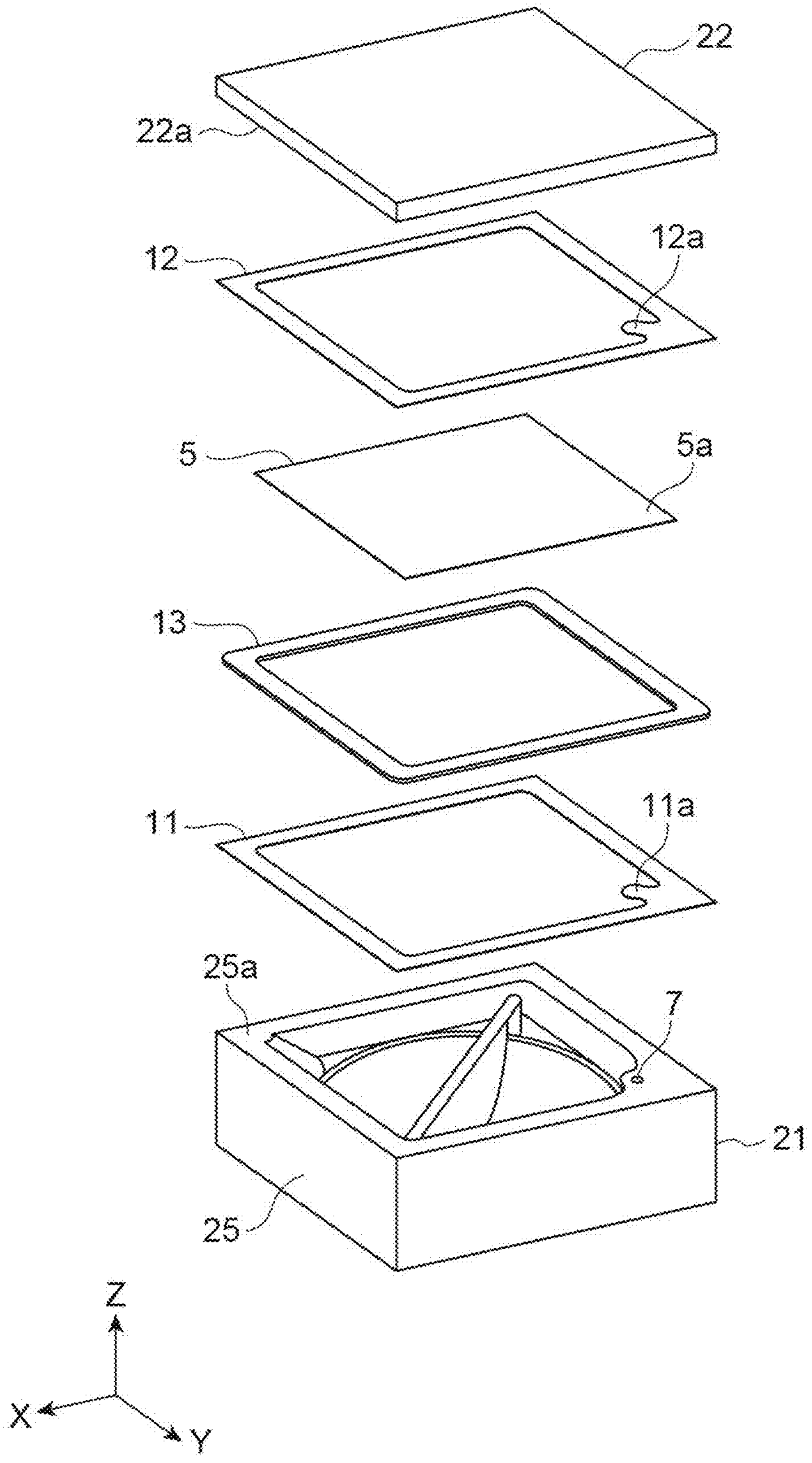
FIG. 4 is an exploded perspective view of the photoelectric tube illustrated in FIG. 1.

As illustrated in FIG. 4, a base layer 11 is disposed in a frame shape on an end surface 25*a* (an end surface on a light transmitting portion 22 side) of the side wall 25 of the main body 21. A base layer 12 is disposed in a frame shape along an outer edge of the light transmitting portion 22 on a surface 22*a* of the light transmitting portion 22 on an electron emitting portion 3 side. A bonding layer 13 is disposed in a frame shape between the base layer 11 and the base layer 12. The light transmitting portion 22 is airtightly bonded to the side wall 25 of the main body 21 by the base layer 11, the base layer 12 and the bonding layer 13. The base layer 11 and the base layer 12 are metal layers (so-called metallized layers) for increasing a degree of adhesion between the bonding layer 13 and the main body 21 and adhesion strength between the bonding layer 13 and the light transmitting portion 22, and, for example, is made of Cr/Ni/Cu or Ti/Pt/Au. The bonding layer 13 is made of a conductive material (for example, bonding metal such as In, or solder such as AuSn).

As illustrated in FIGS. 1, 2, and 3, the electron emitting portion 3 includes an electrode body 31 and a photoelectric surface 32. The electron emitting portion 3 is held by the recess 23 of the main body 21 of the housing 2 in a state where the photoelectric surface 32 is disposed inside the housing 2. In the present embodiment, the electron emitting portion 3 is disposed on an inner surface 23*a* of the recess 23 of the main body 21, and a part of the electron emitting portion 3 is exposed through an opening portion 21*c*, which opens on a surface 21*a* of the main body 21 on an opposite side from the light transmitting portion 22, to the outside on the surface 21*a*. More specifically, for example, the electrode body 31 having a bowl shape is fixed to the inner surface 23*a* of the recess 23 by fusion bonding or bonding by a bonding member, and a bottom portion 31*a* of the electrode body 31 protruding in a convex shape is exposed to the outside on the surface 21*a* of the main body 21 through the opening portion 21*c* of the main body 21. The photoelectric surface 32 is a photoelectric conversion film formed along an inner surface of the bowl-shaped electrode body 31. The electrode body 31 is made of a conductive material (for example, a metal material such as Kovar), and the photoelectric surface 32 is made of, for example, CsTe.

The photoelectric surface 32 is a concave surface facing the light transmitting portion 22 side inside the housing 2. That is, the photoelectric surface 32 is recessed to the opposite side from the light transmitting portion 22 (that is, a side away from the light transmitting portion 22) inside the housing 2. The photoelectric surface 32 includes a bottom surface 32*a* and a side surface 32*b*. The bottom surface 32*a* is a flat surface perpendicular to the Z-axis direction. The side surface 32*b* is curved such that an inclination increases as a distance from the bottom surface 32*a* increases (that is, as approaching the light transmitting portion 22). The side surface 32*b* is connected to the bottom surface 32*a* so that the inclination is continuous. The bottom surface 32*a* has a circular shape when viewed from the light transmitting portion 22 side, and the side surface 32*b* has an annular shape when viewed from the light transmitting portion 22 side. That is, the photoelectric surface 32 has a circular shape when viewed from the light transmitting portion 22 side.

The electron capturing portion 4 is disposed between the light transmitting portion 22 and the photoelectric surface 32 inside the housing 2. The electron capturing portion 4 is a plate-shaped member (thickness: about 0.4 mm) made of a conductive material (for example, a metal material such as Kovar), and is disposed to divide the region inside the housing 2 when viewed from the light transmitting portion 22 side. That is, the electron capturing portion 4 is disposed such that a pair of main surfaces 4*a* of the electron capturing portion 4 is parallel to the Z-axis direction. When viewed in a Y-axis direction (when viewed so as to face a main plane of the plate member), an edge of each of the main surfaces 4*a* extends along the inner surface 23*a* of the recess 23 and has a substantially elliptical shape (a shape having a smooth arc portion and a straight line portion) facing the inner surface 23*a* of the recess 23. The electron capturing portion 4 is supported by the main body 21 of the housing 2. In the present embodiment, the electron capturing portion 4 bridges over an opening edge 23*b* of the recess 23 of the main body 21. More specifically, a pair of end portions 4*b* of the electron capturing portion 4 protruding outward in the X-axis direction is disposed at portions of the opening edge 23*b* facing each other in the X-axis direction.

A part 41 of the electron capturing portion 4 is located inside a region 33 on the inside of the concave photoelectric surface 32. That is, the part 41 of the electron capturing portion 4 is located on the opposite side from the light transmitting portion 22 with respect to an opening edge 32*c* of the concave photoelectric surface 32. A part 42 of the electron capturing portion 4 other than the part 41 is located in a region outside the concave photoelectric surface 32 (that is, outside the region 33). That is, the part 42 of the electron capturing portion 4 is located on the light transmitting portion 22 side with respect to the opening edge 32*c* of the concave photoelectric surface 32. A side surface 41*a* (a side surface between the pair of main surfaces 4*a* and facing the photoelectric surface 32) of the part 41 of the electron capturing portion 4 extends along the photoelectric surface 32 when viewed in the Y-axis direction. The electron capturing portion 4 is separated from the photoelectric surface 32 by a predetermined distance so that a distance between the side surface 41*a* and the photoelectric surface 32 is substantially uniform inside the housing 2, and is not electrically connected to the photoelectric surface 32.

The conductive layer 5 is disposed on the light transmitting portion 22 side of the electron capturing portion 4 to face the photoelectric surface 32 inside the housing 2. In the present embodiment, the conductive layer 5 is disposed along the light transmitting portion 22 to face the photoelectric surface 32 inside the housing 2. The conductive layer 5 is separated from the electron capturing portion 4 by a predetermined distance inside the housing 2, and is not electrically connected to the electron capturing portion 4. In the present embodiment, the conductive layer 5 is disposed on the surface 22*a* of the light transmitting portion 22. That is, the conductive layer 5 is supported by the light transmitting portion 22. The conductive layer 5 is configured to allow light to be detected by the photoelectric tube 1 to pass therethrough. In the present embodiment, the conductive layer 5 is made of a material selected according to a wavelength of the light to be detected by the photoelectric tube 1, and is formed in a film shape with a thickness set according to the wavelength. The material of the conductive layer 5 is, for example, Ni, and the thickness of the conductive layer 5 is, for example, about several nanometers.

As illustrated in FIGS. 1 and 4, the conductive layer 5 is located inside the base layer 12 on the surface 22*a* of the light transmitting portion 22. As an example, the conductive layer 5 has a square shape when viewed in the Z-axis direction, and is located inside the base layer 12 having a square frame shape. A corner portion 5*a* of the conductive layer 5 overlaps a protrusion 12*a* of the base layer 12, and overlaps a protrusion 11*a* of the base layer 11 with the bonding layer 13 interposed therebetween. In this way, the conductive layer 5, the base layer 11, the base layer 12, and the bonding layer 13 are electrically connected to one another. The corner portion 5*a* is one of a pair of corner portions of the conductive layer 5 facing each other in the Y-axis direction. The protrusion 11*a* is a part protruding inward from one of a pair of corner portions of the base layer 11 facing each other in the Y-axis direction, and the protrusion 12*a* is a part protruding inward from one of a pair of corner portions of the base layer 12 facing each other in the Y-axis direction.

As illustrated in FIGS. 1 and 2, a pair of first conductive portions 6 is electrically connected to the electron capturing portion 4, and a part of each of the first conductive portions 6 is exposed to the outside on the surface 21*a* of the main body 21. More specifically, an end portion 6*a* of each of the first conductive portions 6 on the light transmitting portion 22 side is electrically connected to each end portion 4*b* provided at the part 42 of the electron capturing portion 4, and an end portion 6*b* of each of the first conductive portions 6 on an opposite side from the end portion 6*a* is exposed to the outside on the surface 21*a* of the main body 21. Since each first conductive portion 6 is electrically connected to the electron capturing portion 4 outside the region 33 on the inside of the concave photoelectric surface 32, the electron capturing portion 4 and the pair of first conductive portions 6 are separated from the photoelectric surface 32 to which a potential different from that of the electron capturing portion 4 and the pair of first conductive portions 6 is applied, and withstand voltage characteristics between members to which different potentials are applied are improved. As an example, each first conductive portion 6 extends in the Z-axis direction at each of a pair of corner portions of the side wall 25 of the main body 21 facing each other in the X-axis direction. The pair of first conductive portions 6 is integrally formed with the electron capturing portion 4 by a conductive material (for example, Kovar).

As illustrated in FIGS. 1 and 3, the second conductive portion 7 is electrically connected to the conductive layer 5, and a part of the second conductive portion 7 is exposed to the outside on the surface 21*a* of the main body 21. More specifically, an end portion 7*a* of the second conductive portion 7 on the light transmitting portion 22 side is electrically connected to the corner portion 5*a* of the conductive layer 5 through the protrusion 11*a* of the base layer 11, the protrusion 12*a* of the base layer 12, and the bonding layer 13 (see FIG. 4), and an end portion 7*b* of the second conductive portion 7 on an opposite side from the end portion 7*a* is exposed to the outside on the surface 21*a* of the main body 21. As an example, the second conductive portion 7 extends in the Z-axis direction at one of a pair of corner portions of the side wall 25 of the main body 21 facing each other in the Y-axis direction. The second conductive portion 7 is made of a conductive material (for example, Kovar).

In the photoelectric tube 1 configured as described above, for example, a negative potential is applied to the electron emitting portion 3 with a potential of the electron capturing portion 4 (ground potential) as a reference, and a negative potential (or the same potential as a potential of the electron emitting portion 3) is applied to the conductive layer 5 with the potential of the electron emitting portion 3 as a reference. In this state, when light incident on the light transmitting portion 22 from the outside passes through the light transmitting portion 22 and the conductive layer 5 to reach the photoelectric surface 32, photoelectrons are emitted from the photoelectric surface 32 due to a photoelectron emission effect. Of the photoelectrons emitted from the photoelectric surface 32, photoelectrons traveling toward the electron capturing portion 4 are attracted by the electron capturing portion 4 and reach the electron capturing portion 4. Of the photoelectrons emitted from the photoelectric surface 32, photoelectrons traveling toward the light transmitting portion 22 are bounced back by repulsive force generated between the photoelectrons and the conductive layer 5 to reach the electron capturing portion 4. Light can be detected by detecting the photoelectrons (current) reaching the electron capturing portion 4 in this way. Note that from a viewpoint of simplifying power supply to the photoelectric tube 1 by using the same voltage value as much as possible, it is preferable that the electron emitting portion 3 and the conductive layer 5 have the same potential.

As described above, in the photoelectric tube 1, the electron capturing portion 4 is disposed between the light transmitting portion 22 and the photoelectric surface 32 inside the housing 2, and the conductive layer 5 is disposed on the light transmitting portion 22 side of the electron capturing portion 4 to face the photoelectric surface 32 inside the housing 2. In this way, since the electron capturing portion 4 is provided separately from the conductive layer 5 (that is, since the conductive layer 5 alone does not need to perform a function of capturing photoelectrons), the conductive layer 5 can be configured to allow sufficient light to pass therethrough. In this way, light incident on the light transmitting portion 22 from the outside easily reaches the photoelectric surface 32. For this reason, it is possible to improve a probability that light incident on the light transmitting portion 22 from the outside reaches the photoelectric surface 32. In addition, for example, by applying a negative potential to the electron emitting portion 3 with a potential of the electron capturing portion 4 as a reference, and applying a negative potential (or the same potential as a potential of the electron emitting portion 3) to the conductive layer 5 with the potential of the electron emitting portion 3 as a reference, even when some of photoelectrons emitted from the photoelectric surface 32 travel toward the light transmitting portion 22, the some photoelectrons bounce back and easily reach the electron capturing portion 4 due to repulsive force generated between the some photoelectrons and the conductive layer 5. For this reason, it is possible to improve a probability that the photoelectrons emitted from the photoelectric surface 32 are captured by the electron capturing portion 4. As described above, according to the photoelectric tube 1, it is possible to improve light detection efficiency.

In the photoelectric tube 1, the conductive layer 5 is disposed along the light transmitting portion 22 to face the photoelectric surface 32 inside the housing 2. In this way, it is possible to exhibit an effect of the conductive layer 5 along the light transmitting portion 22.

In the photoelectric tube 1, the electron capturing portion 4 is a plate-shaped member, and is disposed to divide the region inside the housing 2 when viewed from the light transmitting portion 22 side. In this way, even light incident on the light transmitting portion 22 at a large incident angle easily reaches the photoelectric surface 32 by being reflected by each of the pair of main surfaces 4*a* of the electron capturing portion 4. For this reason, it is possible to further improve the probability that the light incident on the light transmitting portion 22 from the outside reaches the photoelectric surface 32. In addition, the photoelectrons emitted from the photoelectric surface 32 easily reach each of the pair of main surfaces 4*a* of the electron capturing portion 4. For this reason, it is possible to further improve the probability that the photoelectrons emitted from the photoelectric surface 32 are captured by the electron capturing portion 4.

In the photoelectric tube 1, the light transmitting portion 22 is attached to the main body 21 to close the opening of the recess 23, the electron emitting portion 3 and the electron capturing portion 4 are supported by the main body 21, and the conductive layer 5 is supported by the light transmitting portion 22. In this way, a configuration in which the photoelectric surface 32, the electron capturing portion 4, and the conductive layer 5 are disposed with high accuracy can be easily and reliably realized.

In the photoelectric tube 1, the electron emitting portion 3 is disposed on the inner surface 23*a* of the recess 23, the electron capturing portion 4 bridges over the opening edge 23*a* of the recess 23, and the conductive layer 5 is disposed on the surface 22*a* of the light transmitting portion 22. In this way, the configuration in which the photoelectric surface 32, the electron capturing portion 4, and the conductive layer 5 are disposed with high accuracy can be realized with an efficient layout. In addition, the electron emitting portion 3, the electron capturing portion 4, and the conductive layer 5 can be stably held, and a structure having high earthquake resistance can be obtained.

In the photoelectric tube 1, a part of each first conductive portion 6 electrically connected to the electron capturing portion 4, the part of the second conductive portion 7 electrically connected to the conductive layer 5, and the part of the electron emitting portion 3 are exposed to the outside on the surface 21*a* of the main body 21. In this way, on the same surface (the surface 21*a* of the main body 21) where incidence of light on the light transmitting portion 22 is not hindered and access of an external wiring is easy, the external wiring can be electrically connected to each of a part of each first conductive portion 6, a part of the second conductive portion 7, and a part of the electron emitting portion 3. In addition, a desired potential can be applied to each of the electron emitting portion 3, the electron capturing portion 4, and the conductive layer 5.

Note that, as an example, the photoelectric tube 1 is manufactured as follows. First, the electron emitting portion 3, the integrally formed electron capturing portion 4 and pair of first conductive portions 6, and the second conductive portion 7 (hereinafter referred to as "electron emitting portion 3, etc.") are set on a jig. Subsequently, a Kovar glass plate is melted and re-solidified on the jig on which the electron emitting portion 3, etc. are set, and the electron emitting portion 3, etc. and the main body 21 are unitized. Subsequently, the surface 21*a* of the main body 21 is polished, and the part of each first conductive portion 6, the part of the second conductive portion 7, and the part of the electron emitting portion 3 are exposed to the outside on the surface 21*a* of the main body 21. Subsequently, the base layer 11 is formed on the end surface 25*a* of the side wall 25 of the main body 21. Meanwhile, the conductive layer 5 and the base layer 12 are formed on the surface 22*a* of the light transmitting portion 22. Subsequently, in a high-vacuum space, the base layer 11 formed on the main body 21 and the base layer 12 formed on the light transmitting portion 22 are bonded by the bonding layer 13 to obtain the photoelectric tube 1.

Each of the above-described processes is carried out in a wafer state in which a plurality of structures each serving as the photoelectric tube 1 is two-dimensionally arranged, and finally the individual photoelectric tube 1 is cut out. In this way, it is possible to reduce the number of assembling processes and, in turn, reduce the manufacturing cost, thereby enabling mass production of the photoelectric tube 1 with a reduced size. In the photoelectric tube 1, since the electron emitting portion 3, etc. and the main body 21 are unitized, positional accuracy of the electron emitting portion 3, etc. is improved, and positional shift of the electron emitting portion 3, etc. due to vibration and impact is prevented.

Figure 5:
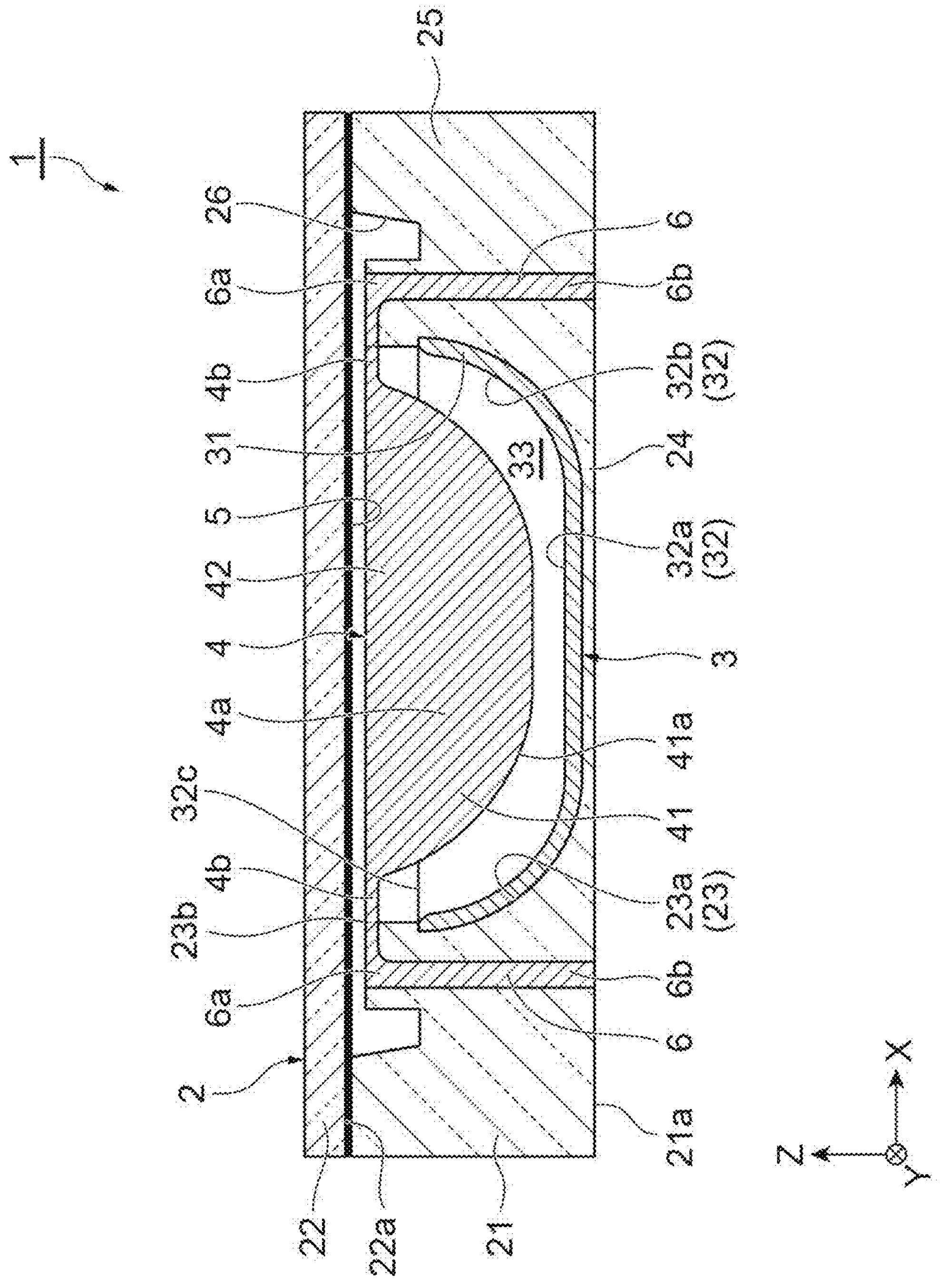
FIG. 5 is a cross-sectional view of a photoelectric tube of a first modified example.
Figure 6:
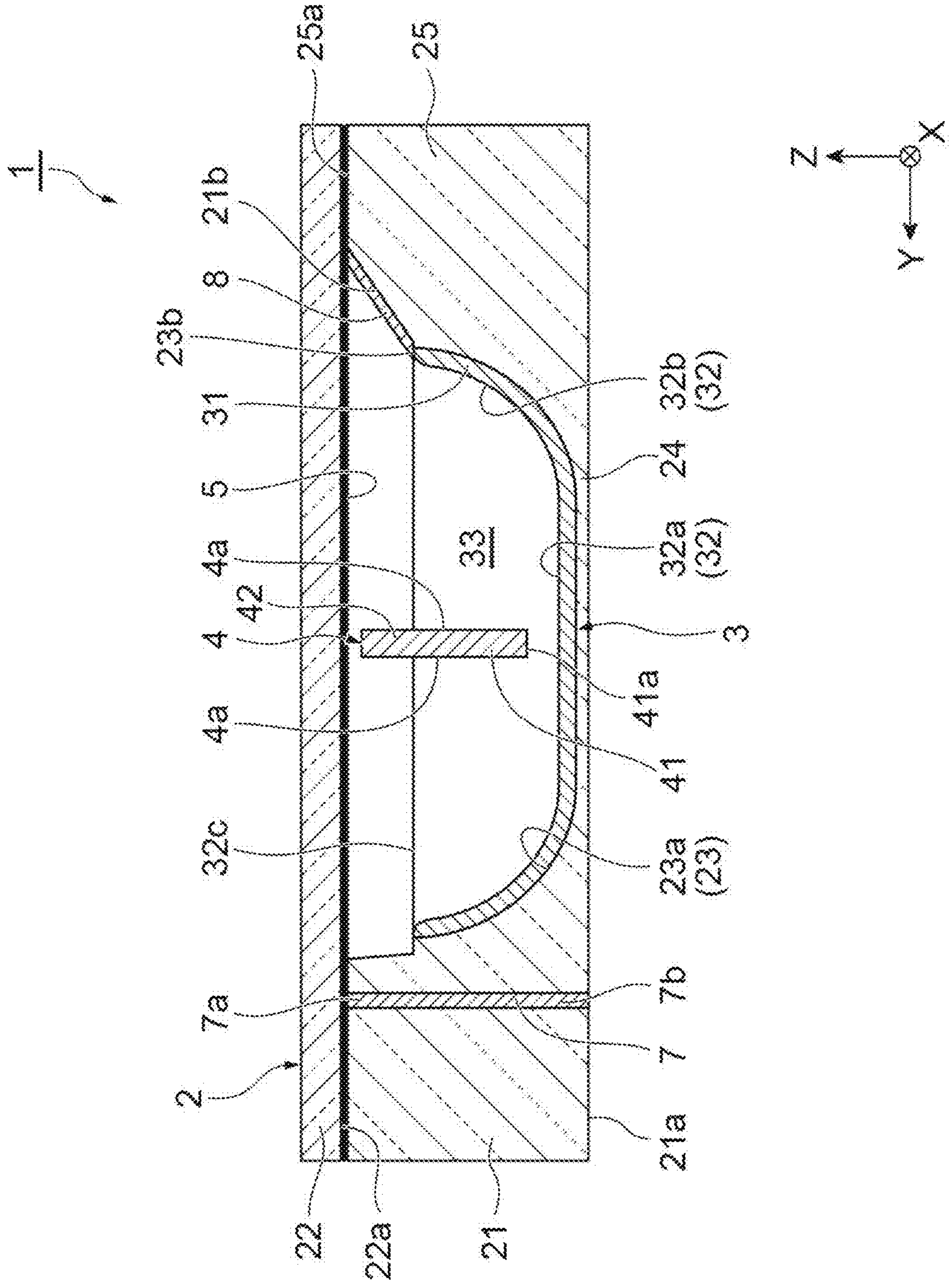
FIG. 6 is a cross-sectional view of the photoelectric tube of the first modified example.

The present disclosure is not limited to the above embodiment. As illustrated in FIGS. 5 and 6, in the photoelectric tube 1, the electron emitting portion 3 and the conductive layer 5 may be electrically connected by a wiring 8 without a part of the electron emitting portion 3 being exposed to the outside on the surface 21*a* of the main body 21. In the photoelectric tube 1 illustrated in FIGS. 5 and 6, the wiring 8 is formed on an inclined surface 21*b* of the main body 21. The inclined surface 21*b* extends from the opening edge 23*b* of the recess 23 to the end surface 25*a* of the side wall 25. In the photoelectric tube 1 illustrated in FIGS. 5 and 6, on the same surface (the surface 21*a* of the main body 21) where incidence of light on the light transmitting portion 22 is not hindered and access of an external wiring is easy, the external wiring can be electrically connected to each of a part of each first conductive portion 6 and a part of the second conductive portion 7. For example, a negative potential can be applied to the electron emitting portion 3 and the conductive layer 5 with the potential of the electron capturing portion 4 (ground potential) as a reference. In addition, it is possible to simplify a structure of a conductive portion for electrically connecting the external wiring.

As illustrated in FIGS. 5 and 6, in the photoelectric tube 1 in which the electron emitting portion 3 and the conductive layer 5 are electrically connected by the wiring 8, a part of the electron emitting portion 3 may be exposed to the outside on the surface 21*a* of the main body 21 without providing the second conductive portion 7. Even in that case, by electrically connecting the external wiring to each of a part of each first conductive portion 6 and a part of the electron emitting portion 3 exposed to the outside on the surface 21*a* of the main body 21, for example, a negative potential can be applied to the electron emitting portion 3 and the conductive layer 5 with the potential of the electron capturing portion 4 (ground potential) as a reference.

Figure 7:
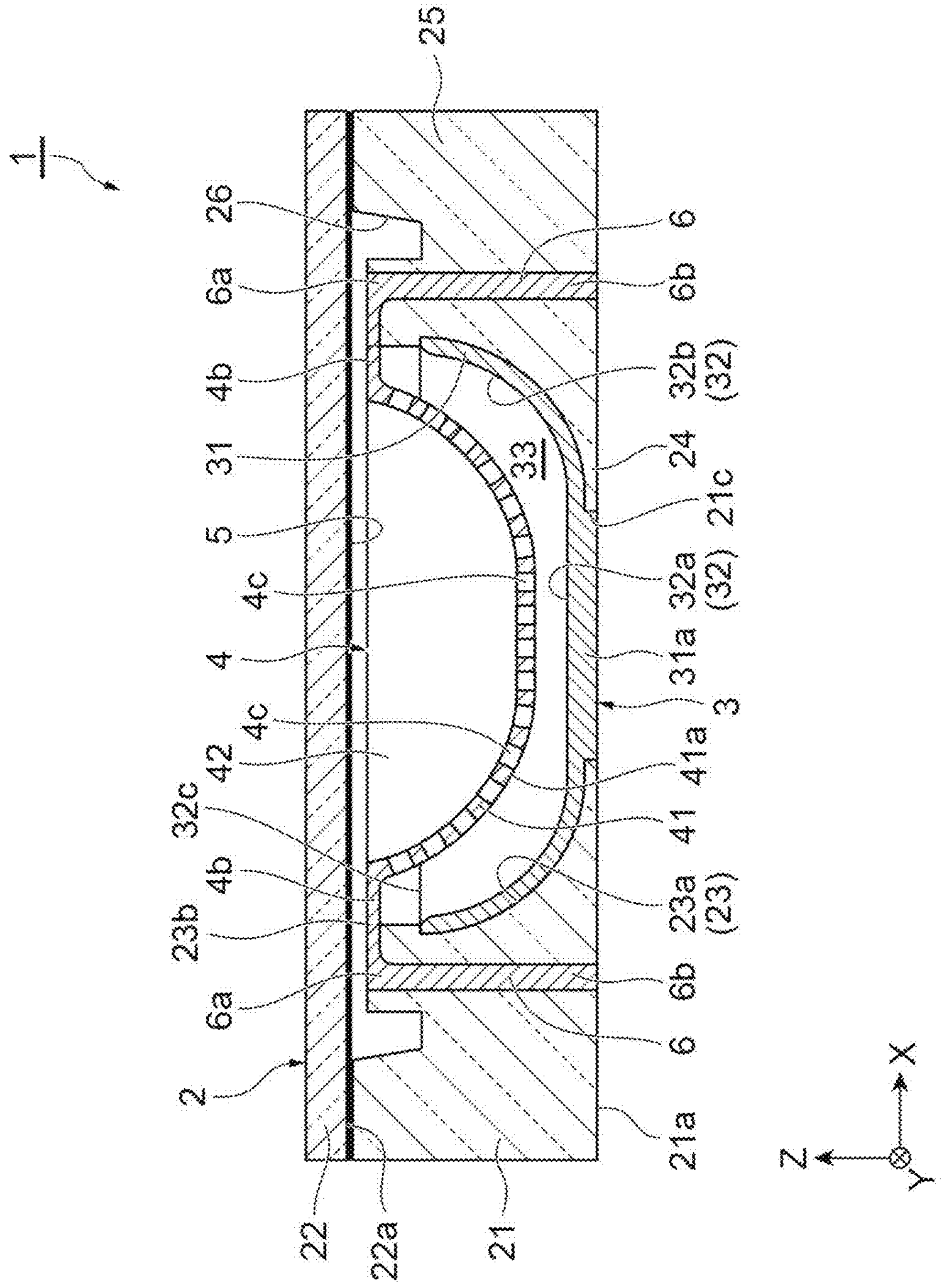
FIG. 7 is a cross-sectional view of a photoelectric tube of a second modified example.
Figure 8:
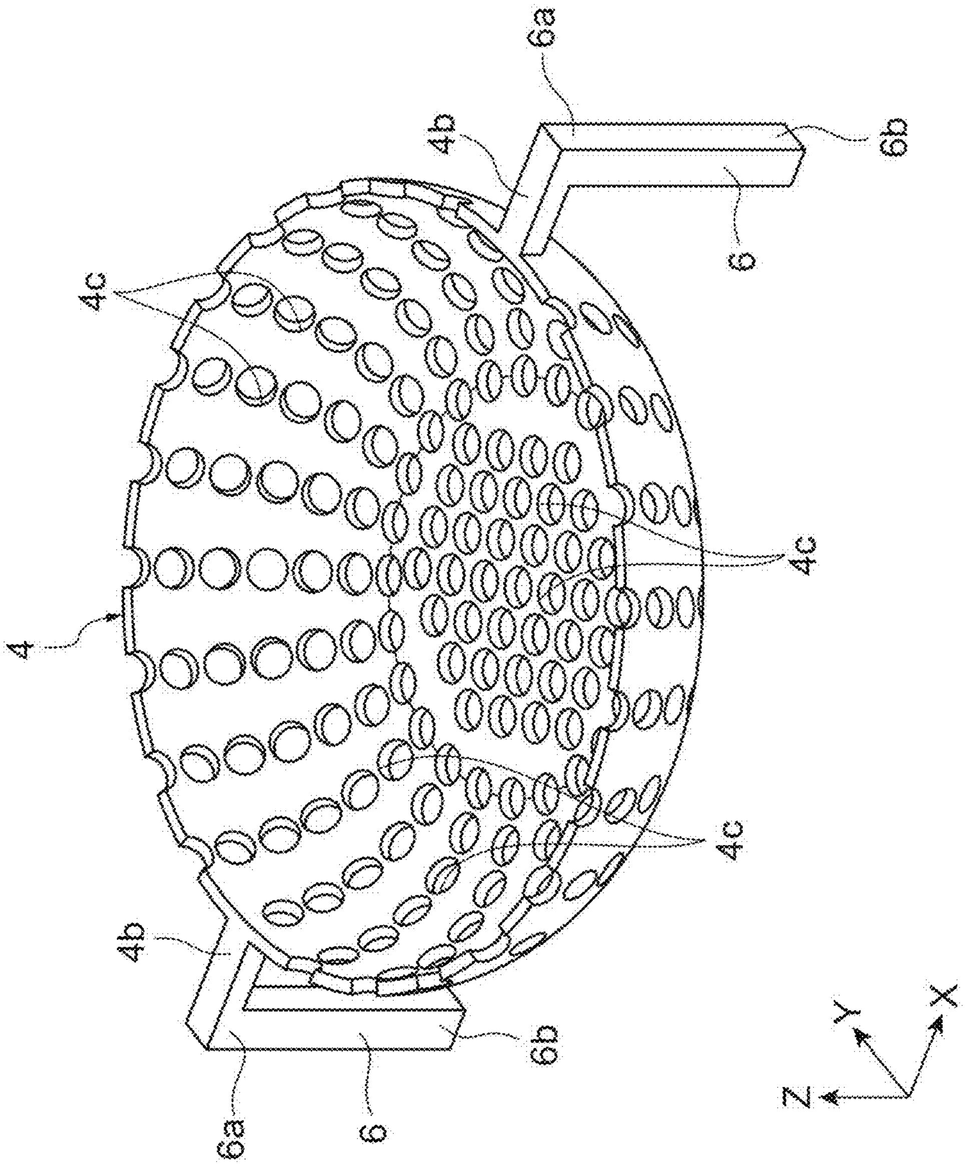
FIG. 8 is a perspective view of an electron capturing portion of the photoelectric tube of the second modified example.

The electron capturing portion 4 is not limited to the plate-shaped member. As an example, as illustrated in FIGS. 7 and 8, the electron capturing portion 4 may be a bowl-shaped member having a plurality of light passage openings 4*c*. In the photoelectric tube 1 illustrated in FIG. 7, the part 41 of the electron capturing portion 4 including the bottom portion is located inside the region 33 on the inside of the photoelectric surface 32. In the photoelectric tube 1 illustrated in FIG. 7, light passing through the light transmitting portion 22 and the conductive layer 5 reaches the photoelectric surface 32 through the plurality of light passage openings 4*c*. Note that, in FIG. 7, illustration of the light passage openings 4*c* formed in a part of the electron capturing portion 4 other than a cross-sectional part is omitted.

Figure 9:
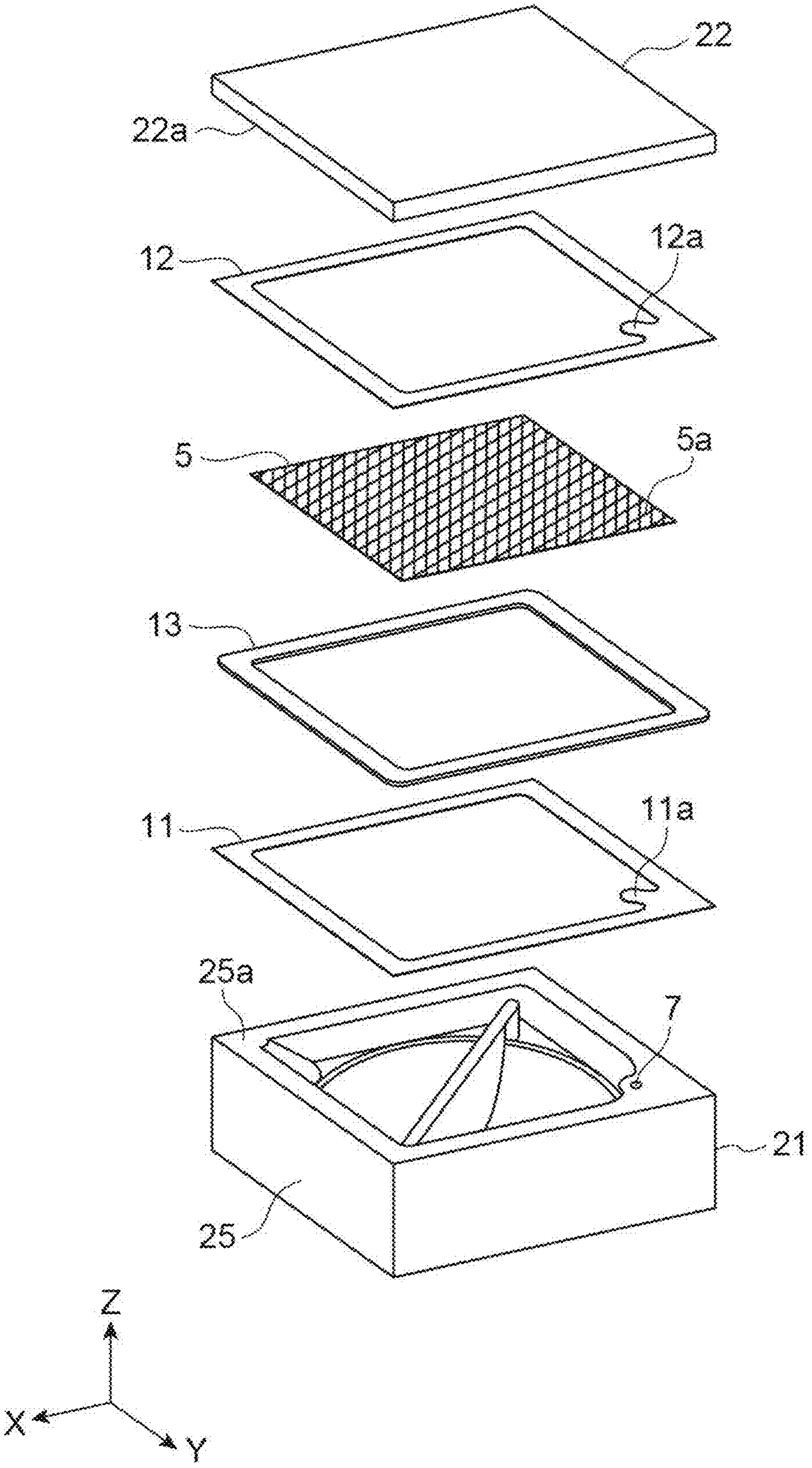
FIG. 9 is an exploded perspective view of a photoelectric tube of a third modified example.

The conductive layer 5 is not limited to one formed in a film shape. As an example, as illustrated in FIG. 9, the conductive layer 5 may be formed in a mesh shape. In other words, it is sufficient that the conductive layer 5 is configured to allow light to pass therethrough.

In the above embodiment and all modified examples, the region inside the housing 2 may be a region filled with a discharge gas such as neon or hydrogen. In the above embodiment and all the modified examples, one first conductive portion 6 instead of the pair of first conductive portions 6 may be electrically connected to the electron capturing portion 4.

In the above embodiment and all the modified examples, it is sufficient that the conductive layer 5 is disposed on the light transmitting portion 22 side of at least the part of the electron capturing portion 4 so as to face the photoelectric surface 32 inside the housing 2. As an example, the conductive layer 5 may be supported by the main body 21 by being stretched to a space on the inside of the side wall 25 of the main body 21 without coining into contact with the light transmitting portion 22. In the above embodiment and all the modified examples, the photoelectric surface 32 does not need to be a concave surface facing the light transmitting portion 22 side inside the housing 2, and may be, for example, a flat surface. In the above embodiment and all the modified examples, in the electron capturing portion 4, at least the part 41 does not need to be located inside the region 33 on the inside of the concave photoelectric surface 32, and, for example, the entire electron capturing portion 4 does not need to be located inside the region 33 on the inside of the concave photoelectric surface 32. In the above embodiment and all the modified examples, the first conductive portion 6 may be directly connected to the electron capturing portion 4 or may be indirectly connected to the electron capturing portion 4 (that is, via another conductive member). In other words, it is sufficient that the first conductive portion 6 is electrically connected to the electron capturing portion 4. In the above embodiment and all the modified examples, the second conductive portion 7 may be directly connected to the conductive layer 5 or may be indirectly connected to the conductive layer 5 (that is, via another conductive member). In other words, it is sufficient that the second conductive portion 7 is electrically connected to the conductive layer 5.

REFERENCE SIGNS LIST

1: photoelectric tube, 2: housing, 3: electron emitting portion, 4: electron capturing portion, 5: conductive layer, 6: first conductive portion, 7: second conductive portion, 8: wiring, 21: main body, 21*a*: surface, 22: light transmitting portion, 22*a*: surface, 23: recess, 23*a*: inner surface, 23*b*: opening edge, 32: photoelectric surface.

The invention claimed is:

1. A photoelectric tube comprising:

a housing including a light transmitting portion;

an electron emitting portion including a photoelectric surface disposed inside the housing;

an electron capturing portion disposed between the light transmitting portion and the photoelectric surface inside the housing; and a conductive layer disposed on the light transmitting portion side of at least a part of the electron capturing portion to face the photoelectric surface inside the housing, and configured to allow light to pass therethrough, wherein the electron capturing portion is a plate-shaped member, and is disposed to divide a region inside the housing when viewed from the light transmitting portion side.

2. The photoelectric tube according to claim 1, wherein the conductive layer is disposed along the light transmitting portion to face the photoelectric surface inside the housing.

3. The photoelectric tube according to claim 1, wherein:

the housing further includes a main body having a recess;

the light transmitting portion is attached to the main body to close an opening of the recess;

the electron emitting portion and the electron capturing portion are supported by the main body; and the conductive layer is supported by the light transmitting portion.

4. The photoelectric tube according to claim 3, wherein:

the electron emitting portion is disposed on an inner surface of the recess;

the electron capturing portion bridges over an opening edge of the recess; and the conductive layer is disposed on a surface of the light transmitting portion on the electron emitting portion side.

5. The photoelectric tube according to claim 3, further comprising:

a first conductive portion electrically connected to the electron capturing portion; and a second conductive portion electrically connected to the conductive layer, wherein a part of the first conductive portion, a part of the second conductive portion, and a part of the electron emitting portion are exposed to an outside on a surface of the main body on an opposite side from the light transmitting portion.

6. The photoelectric tube according to claim 3, further comprising:

a first conductive portion electrically connected to the electron capturing portion;

a second conductive portion electrically connected to the conductive layer; and a wiring electrically connecting the electron emitting portion and the conductive layer to each other, wherein a part of the first conductive portion and a part of the second conductive portion are exposed to an outside on a surface of the main body on an opposite side from the light transmitting portion.

7. A photoelectric tube comprising:

a housing including a light transmitting portion;

an electron emitting portion including a photoelectric surface disposed inside the housing;

an electron capturing portion disposed between the light transmitting portion and the photoelectric surface inside the housing; and a conductive layer disposed on the light transmitting portion side of at least a part of the electron capturing portion to face the photoelectric surface inside the housing, and configured to allow light to pass therethrough, wherein:

the housing further includes a main body having a recess;

the light transmitting portion is attached to the main body to close an opening of the recess;

the electron emitting portion and the electron capturing portion are supported by the main body; and the conductive layer is supported by the light transmitting portion.

8. The photoelectric tube according to claim 7, wherein the conductive layer is disposed along the light transmitting portion to face the photoelectric surface inside the housing.

9. The photoelectric tube according to claim 7, wherein:

the electron emitting portion is disposed on an inner surface of the recess;

the electron capturing portion bridges over an opening edge of the recess; and the conductive layer is disposed on a surface of the light transmitting portion on the electron emitting portion side.

10. The photoelectric tube according to claim 7, further comprising:

a first conductive portion electrically connected to the electron capturing portion; and a second conductive portion electrically connected to the conductive layer, wherein a part of the first conductive portion, a part of the second conductive portion, and a part of the electron emitting portion are exposed to an outside on a surface of the main body on an opposite side from the light transmitting portion.

11. The photoelectric tube according to claim 7, further comprising:

a first conductive portion electrically connected to the electron capturing portion;

a second conductive portion electrically connected to the conductive layer; and a wiring electrically connecting the electron emitting portion and the conductive layer to each other, wherein a part of the first conductive portion and a part of the second conductive portion are exposed to an outside on a surface of the main body on an opposite side from the light transmitting portion.

* * * * *